UNITED STATES PATENT OFFICE.

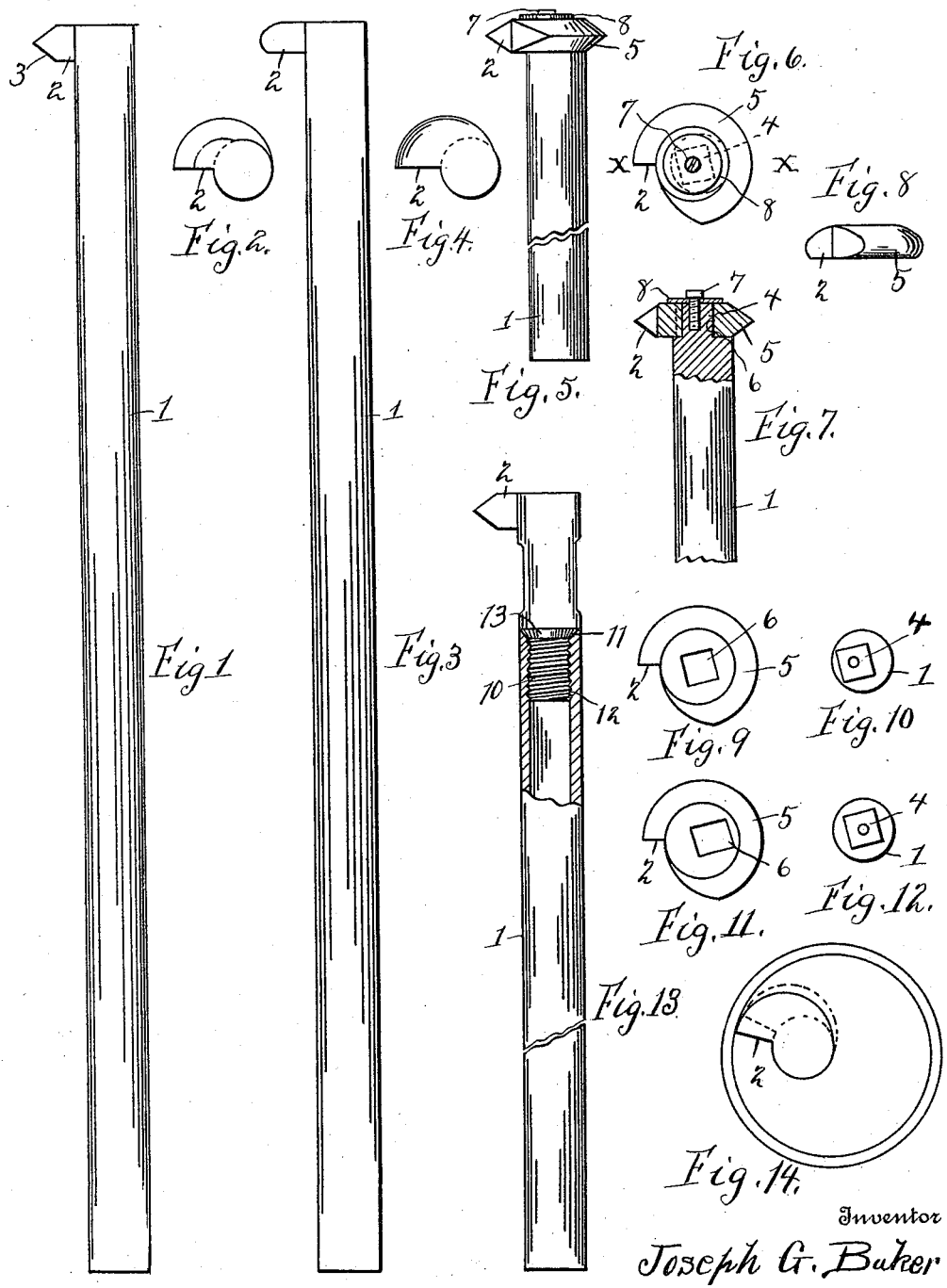

JOSEPH G. BAKER, OF VINELAND, NEW JERSEY.

THREADING AND INSIDE-TURNING TOOL.

1,052,400.     Specification of Letters Patent.     Patented Feb. 4, 1913.

Application filed April 20, 1911. Serial No. 622,237.

*To all whom it may concern:*

Be it known that I, JOSEPH G. BAKER, a citizen of the United States, residing at Vineland, in the county of Cumberland and State of New Jersey, have invented a certain new and useful Improvement in Threading and Inside-Turning Tools, of which the following is a specification.

My invention relates to a new and useful improvement in threading and inside turning tools, and has for its object to so construct a tool that it may be sharpened on the outer face of the cutting surface without changing the form, thus greatly facilitating the sharpening of the tool for this class of work.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1, represents a tool shank with the cutting end formed therewith in accordance with my improvement. Fig. 2, an end view of Fig. 1. Fig. 3, a view similar to Fig. 1, showing a round nose turning tool. Fig. 5, a view similar to Fig. 1, but showing the cutter made separate and attached to the tool shank. Fig. 4, an end view of Fig. 3. Fig. 6, an end view of Fig. 5. Fig. 7, a view of a portion of the tool shank, partly sectioned away, the cutter being in section. Fig. 8, a detail of the cutter such as used in Figs. 5, 6 and 7 but showing it as a round nose cutter. Fig. 9, a face view of the detachable cutter. Fig. 10, an end view of the tool shank adapted to receive the detachable cutter. Fig. 11, a face view of a cutter in which the square opening for fitting over the lug of the tool shank is formed eccentric with the circumference of the cutter. Fig. 12, an end view of a tool shank adapted to receive a cutter such as shown in Fig. 11. Fig. 13, a side elevation of another form of my improved tool, partly shown in section to clearly illustrate the construction, and Fig. 14 a view showing the tool in operation upon the inside of a circular piece of work, illustrating the clearance produced by the eccentricity of the cutter.

In carrying out my invention as illustrated in Figs. 1 to 4, I forge or otherwise form upon the end of the tool shank (1) which is preferably round in cross section, a cutter 2, the end or cutting surface of which is shaped as at 3 to correspond to the shape of the work to be performed, such as a V-shaped screw thread and this cutter is eccentric with the center of the tool shank as clearly shown in Figs. 2 and 4, and as the cutting surface forms a part of the circle the grinding away of the face of the cutting surface in sharpening the tool in no wise changes the form of the tool.

The serious disadvantage heretofore experienced in threading tools of the old style when having to resharpen them, was the necessity of grinding on two sides and the top and this grinding was done to a gage in order to maintain the shape, while in my improved tool it is only necessary to grind the end or cutting surface, and the same shape and clearance will be maintained throughout the life of the tool.

The fact that the cutter is a part of a circle and eccentric with the center of the tool shank, produces the clearance necessary between the work and the tool as clearly illustrated in Fig. 14, and this clearance may be increased or decreased by simply revolving the tool shank more or less in the holder as illustrated in dotted lines in the last named figure, and as will be readily understood.

In Figs. 5 to 8 I have illustrated my improvement in such form that the cutter may be made separate from the tool shank and attached thereto, thus permitting the replacing of a worn out cutter with a new cutter without discarding the shank. In this construction the shank has formed upon one end thereof, a squared lug 4 and the cutter 5 has a squared hole 6 formed therein which fits over the squared lug and is held in place by a screw 7 threaded into the lug having a washer 8 interposed between its head and the cutter. When this construction is utilized, the squared lug is either formed to one side of the axial center of the tool shank and the squared hole in the cutter formed in the center of the latter, or else the squared lug is formed in the center of the tool shank and the squared hole in the cutter is formed to one side of the center of said cutter so that when the cutter is secured upon the tool shank its cutting surface will be eccentric relative to the axial center of the tool shank for the same purpose above described in connection with Figs. 1 to 4.

A great economy is effected by the use of the detachable cutter since the tool shank has practically no wear thereon and they last indefinitely, the small cutters being replaced as they are worn out, and on account of the cutting nose of these cutters extending throughout a large portion of a circle, they will last for a considerable length of time and the same surface will be presented every time the tool is sharpened by grinding upon the face or end, without affecting the clearance or changing the form of the cutter after each grinding.

In Fig. 13 I have shown a further modified form of my invention in which the shank (1) is formed from a tube or rod having one end provided with an internal thread 10 and countersunk or beveled outward as at 11. Into this shank is threaded the externally threaded auxiliary shank 12 which is formed integral with the cutter 2, and adjacent the threaded portion the shank is produced conical in shape as at 13 so that it corresponds with the countersunk end 11, and when in place the cutter will be prevented from working loose. By the use of this form of my invention the cutter after being entirely used, may be unthreaded from the shank and thrown away and replaced by a new cutter. This permits the cutter to be made by forging and the shank is saved for use with other cutters, thus reducing the expense of manufacture. The shank being of a tube, is stronger than the solid bar while being lighter in weight.

Of course I do not wish to be limited to the exact details of construction as here shown, as these may be varied within the limits of the appended claims without departing from the spirit of my invention.

Having thus fully described my invention, what I claim as new and useful, is—

1. An inside threading and turning tool comprising a shank having one end threaded and provided with a conical portion adjacent said threaded portion, a cutting surface carried by said shank, said cutting surface being a true circle set eccentric to the shank, and a tubular shank having one end countersunk and threaded internally, said threads engaging with the threads of the tool shank.

2. An inside threading and turning tool comprising a shank and a cutter, the latter immovably carried by the former at right angles thereto for permitting the insertion of said tool into the work, said cutter having a cutting surface of any desired shape extending through a portion of a true circle whereby its shape is maintained throughout said portion of the circle to permit the grinding of the face for sharpening without altering the shape of the cutting surface, said cutting surface lying eccentric to the axial center of the shank allowing regulation of clearance by rotating said shank.

In testimony whereof, I have hereunto affixed my signature in the presence of two subscribing witnesses.

JOSEPH G. BAKER.

Witnesses:
 EDWARD W. AUSTIN,
 M. E. YOST.

---

Copies of this patent may be obtained for five cents each, by addressing the "Commissioner of Patents, Washington, D. C."